United States Patent [19]

Takada

[11] Patent Number: 5,795,256
[45] Date of Patent: Aug. 18, 1998

[54] JIG APPARATUS FOR ASSEMBLING BELT ONTO VARIATOR

[75] Inventor: Kazutoshi Takada, Saitama-ken, Japan

[73] Assignee: Honda Giken Kogyo Kabushiki Kaisha, Tokyo, Japan

[21] Appl. No.: 589,690

[22] Filed: Jan. 22, 1996

[51] Int. Cl.$^6$ .................................................. F16H 7/24
[52] U.S. Cl. .................................................. 474/37
[58] Field of Search ............................ 474/18, 28, 37, 474/110, 113

[56] References Cited

U.S. PATENT DOCUMENTS

| | | | |
|---|---|---|---|
| 4,403,974 | 9/1983 | Sherman et al. | 474/11 |
| 4,884,997 | 12/1989 | Hattori | 474/28 |
| 4,909,776 | 3/1990 | Sakakibara et al. | 471/25 |

FOREIGN PATENT DOCUMENTS

| | | | |
|---|---|---|---|
| 7-74605 | 10/1987 | Japan | |
| 405149397A | 6/1993 | Japan | 474/37 |
| 406050426A | 2/1994 | Japan | 474/37 |
| 996773 | 2/1983 | U.S.S.R. | 474/113 |

*Primary Examiner*—David J. Bagnell
*Assistant Examiner*—Tony Boyd
*Attorney, Agent, or Firm*—Armstrong, Westerman, Hattori, McLeland & Naughton

[57] ABSTRACT

A jig apparatus is used in extending a belt across a pair of pulleys of a variator for a transmission of a motor vehicle. The variator has the pair of pulleys, a groove width of each of which is variable, and a belt for driving the pulleys. A supporting bar and a supporting pipe hold the pulleys such that an axial line of rotation of each of the pulleys becomes parallel to each other. A groove width of at least one of the pulleys is pneumatically or mechanically widened. A sheave half of each of the pulleys is brought into a pulley groove of the other of the pulleys.

3 Claims, 6 Drawing Sheets

JIG APPARATUS FOR ASSEMBLING BELT ONTO VARIATOR

BACKGROUND OF THE INVENTION

1. Field of the Invention

The present invention relates to a jig apparatus for use in extending a belt across (or assembling a belt onto) a pair of pulleys in a variator (or a continuously variable transmission).

2. Description of the Related Art

As a transmission for a motor vehicle, there has been recently used a variator which is provided with a pair of pulleys each having a V-shaped groove (also called a "V-groove") whose groove width is variable, and a belt to link or drive them together. In this variator, by increasing or decreasing the groove widths of the pulleys in a manner, or in a direction, opposite to each other, the transmission ratio (or speed-changing ratio) is continuously varied. The pulley to be used in this variator is made up by mounting a fixed (or stationary) sheave half member (or simply called a "sheave half") and a movable sheave half on a single rotary shaft, and the movable sheave half is held in a manner to be movable in the axial direction of the rotary shaft by means of hydraulic pressure, or the like. By varying the distance between the two sheave halves, the size of the pitch diameter of the belt to be extended across the pulleys is varied, whereby the speed changing ratio can be variably, or steplessly, changed. Also, the rotary shafts of both of the pulleys is supported on both of ends inside the transmission. It follows that the belt must be extended across both the pulleys before the pulleys are assembled into the transmission. However, the movable sheave half is urged, or pressed, in the direction of narrowing the groove width by means of a spring so as not to loosen the belt even if the hydraulic pressure for moving the movable sheave half is lowered. Accordingly, in a condition before assembling both the pulleys into the transmission, they are both in a state of maximum pitch diameter. The belt will thus be too short to be extended across both the pulleys. It therefore becomes necessary, in assembly steps of each pulley, to place the belt on one of the sheave halves and then assemble the other sheave half to thereby pinch the belt between both the sheave halves.

If it is attempted to assemble the belt simultaneously with the assembling of the pulleys, the pair of pulleys must be assembled at the same time. This results in a disadvantage in that the assembly steps of the pulleys become complicated and that, should a mistake happen in the assembling of one of the pulleys, the other pulley cannot be used anymore.

SUMMARY OF THE INVENTION

In view of the above disadvantages, the present invention has an object of providing such a jig apparatus for assembling a belt of a variator as will enable one to extend the belt across both the pulleys in a condition in which the pair of pulleys have been previously assembled.

In order to attain the above object, the present invention is a jig apparatus for use in extending a belt across a pair of pulleys of a variator, the jig apparatus comprising: a pair of holding members for holding the pulleys such that an axial line of rotation of each of the pulleys becomes parallel to each other; widening means for widening a groove width of at least one of the pulleys; and moving means for relatively moving the both holding members such that a sheave half of each of the pulleys gets into a pulley groove of the other of the pulleys.

Preferably, the widening means is made up of a means for inputting a negative pressure or a positive pressure to a hydraulic actuator which controls an axial movement of a movable sheave half of at least one of the pulleys, or the widening means is made up of a mechanical axial moving means operative to engage a movable sheave half of at least one of the pulleys and to thereby move it with respect to the fixed sheave half.

The belt is set to such a length as to be effectively engaged with, or extended across, both the pulleys when, in a condition in which both the pulleys have been assembled into the variator, the groove width of one of the pulleys is maximum and the groove width of the other is minimum. Therefore, if the pitch diameter is made smaller by enlarging the groove width of at least one of the pulleys, and if the distance between the axes of both the pulleys is narrowed by moving the holding means such that the sheave half of each of the pulleys gets into, or is brought into, the pulley groove of the other of the pulleys, the belt that is set to the above-described length can be assembled or fit onto both the pulleys.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF PREFERRED EMBODIMENTS

Figure 1:
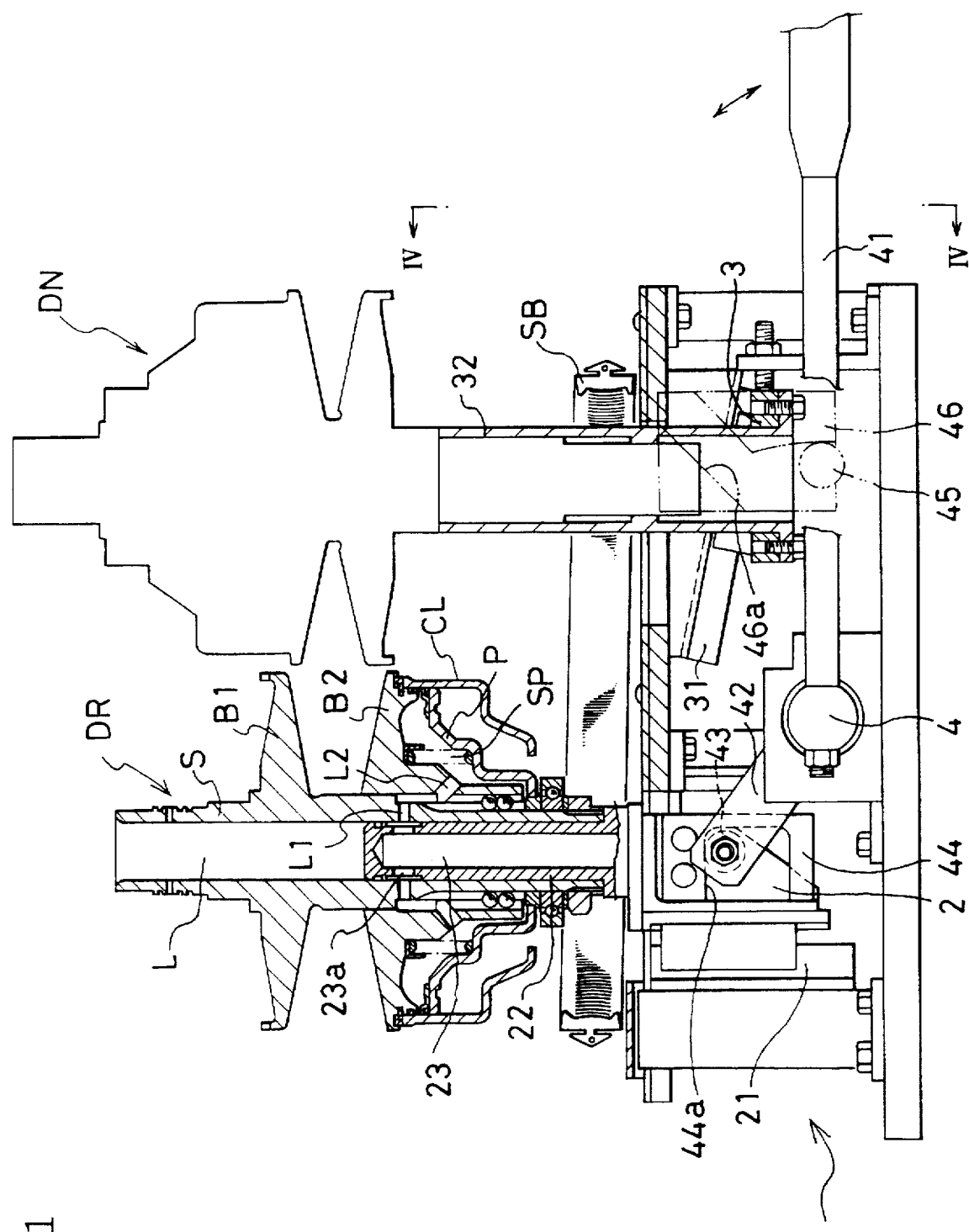
FIG. 1 is a front view, partly shown in section, showing the construction of one embodiment of the apparatus of the present invention.
Figure 2:
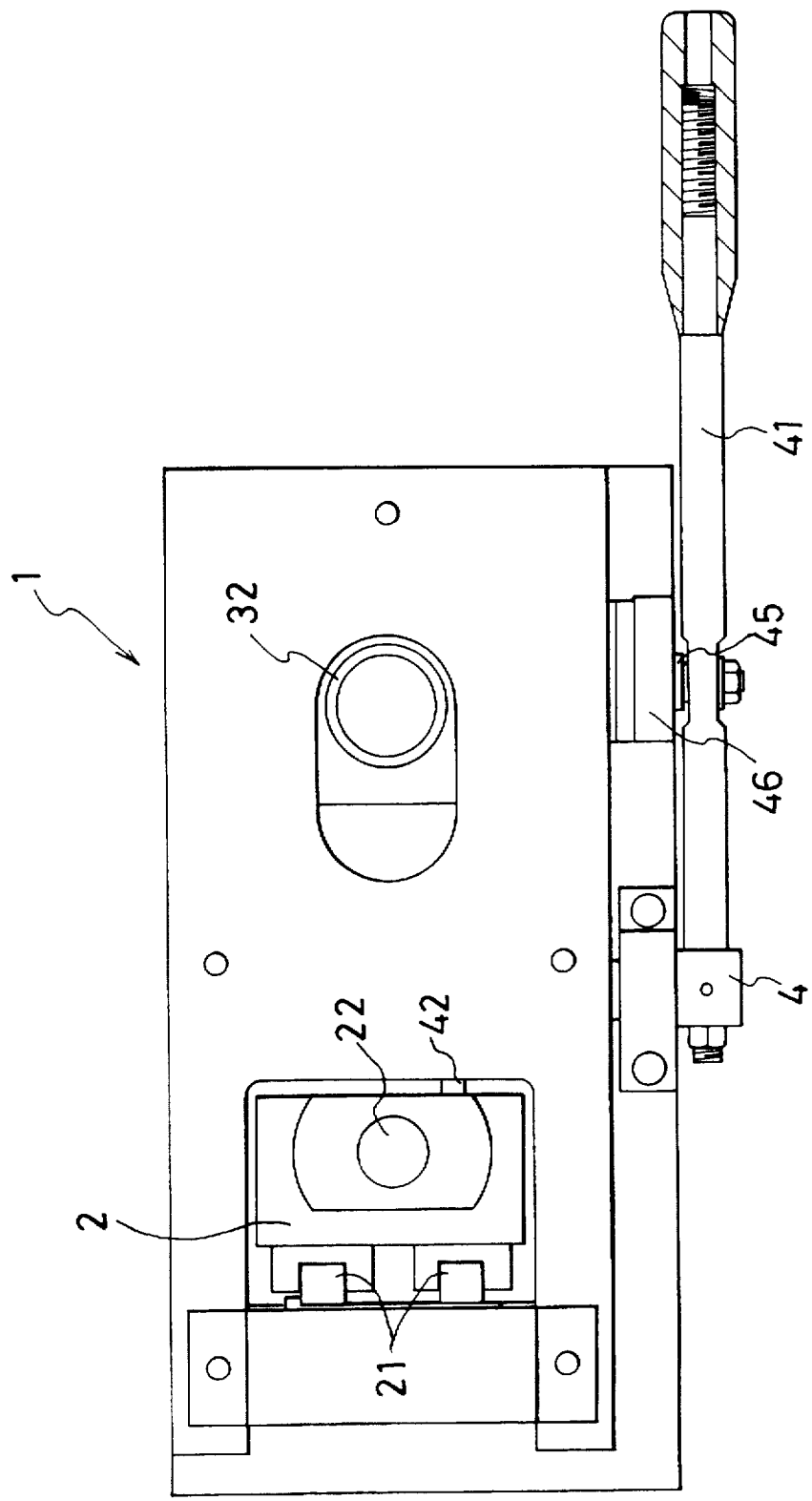
FIG. 2 is a plan view showing the construction of the embodiment shown in FIG. 1.

Referring to the drawings, references DR and DN denote pulleys to be assembled onto a variator (or a continuously variable transmission), and DR denotes a drive pulley on an input side and DN denotes a driven pulley on an output side. Both the pulleys DR, DN have the same construction. An explanation about the construction will now be made by taking the drive pulley DR as an example. On a rotary shaft S there is integrally formed a fixed or stationary sheave half B1 which constitutes one of the inclined surfaces of the V-shaped groove or the V-groove. A movable sheave half B2 which constitutes the other of the inclined surfaces of the V-groove is mounted on the rotary shaft S via a ball spline in a manner movable in the axial direction of the rotary shaft S. On the rear surface of the movable sheave half B2 there is fixed a cylinder CL of a cylindrical shape. On the inner side of the cylinder CL, a piston P which forms an oil chamber in cooperation with the rear surface of the movable sheave B2 is fixedly assembled to the rotary shaft S. The cylinder CL and the piston P constitute a hydraulic actuator which controls an axial movement of the movable sheave half B2. When a working oil is introduced from an oil pressure supply passage L in the rotary shaft S to the oil chamber via oil passages L1, L2, the movable sheave half B2 is moved towards the stationary sheave B1, thereby narrowing the width of the V-groove. In the oil chamber there is disposed a spring, in a contracted condition, which urges the movable sheave B2 towards the stationary sheave half B1. A supporting bar 22 which projects upwards from an upper surface of the jig apparatus 1 for assembling a belt is inserted into the oil pressure supply passage L which is provided in the rotary shaft S of the drive pulley DR. The drive pulley DR is thus vertically erected such that the side of the movable sheave half B2 is located downwards. On the other hand, the rotary shaft of the driven pulley DN is inserted into a supporting pipe 32 which projects upwards from the upper surface of a jig apparatus 1 such that the side of the movable sheave half is located upwards. The belt SB is disposed in advance on the upper surface of the jig apparatus 1 so that it encircles the supporting bar 22 and the supporting pipe 32.

This supporting bar 22 is mounted on an upper surface of an elevating base 2 which is supported by a linear guide 21 so as to be movable up and down, and is also provided with an axial hole 23 which is communicated with a vacuum pump (not illustrated). When the drive pulley DR is set in position onto the supporting bar 22, the axial hole 23 is communicated with the oil passage L1 via a radial communicating hole 23a. On the other hand, the supporting pipe 32 is mounted on a shift base 3 which is supported by a linear guide 31 mounted at a predetermined angle to the horizontal surface. This shift base 3 is arranged to move parallel with a plane including the supporting bar 22 and the supporting pipe 32, and to rise by a predetermined angle with a movement to approach the supporting bar 22.

Figure 3:
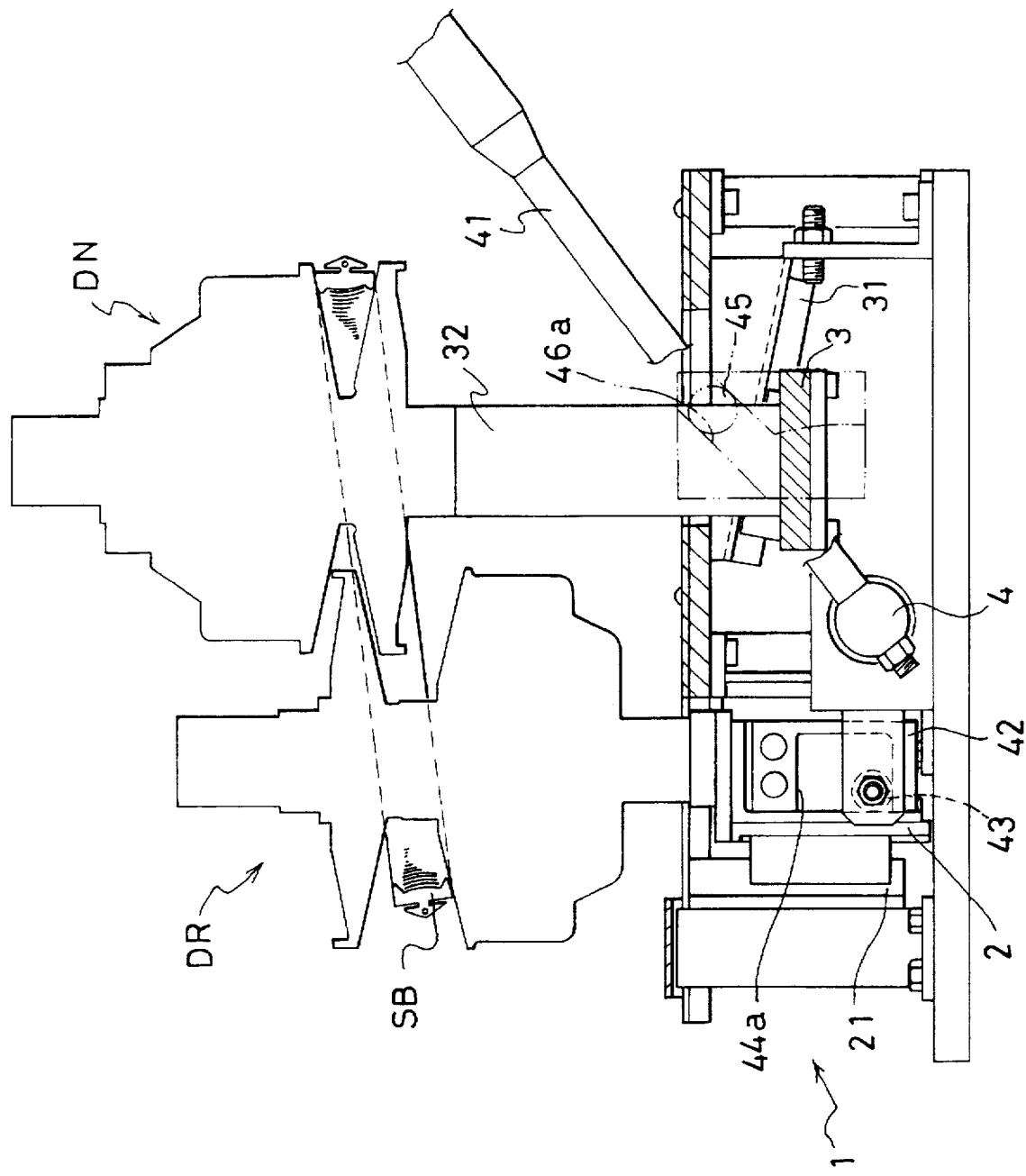
FIG. 3 is a front view showing the operation performed by lifting the handle.
Figure 4:
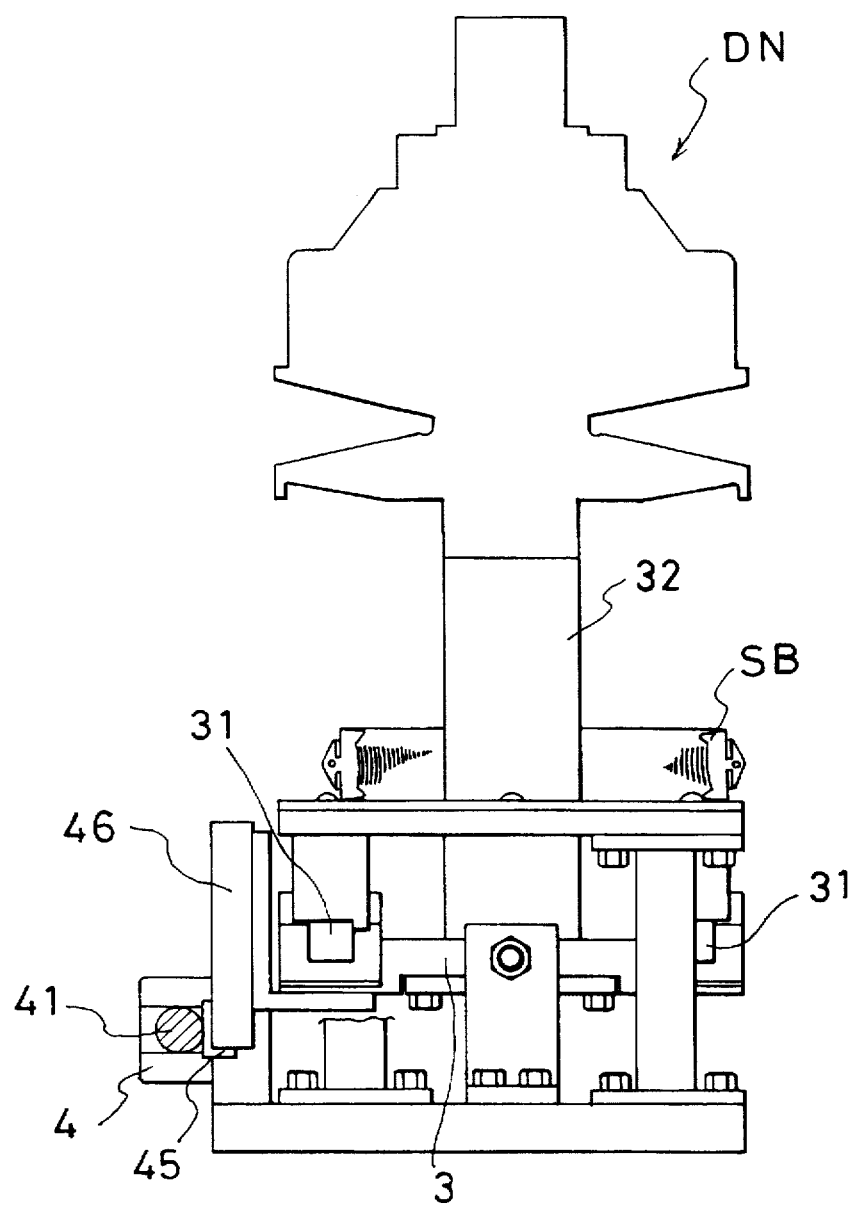
FIG. 4 is a sectional view taken along the line IV—IV in FIG. 1.

On the bottom surface of the jig apparatus 1, there is laterally provided a swing shaft 4 in a position between the supporting bar 22 and the supporting pipe 32. To the swing shaft 4 there are attached an arm 42 which extends towards the supporting bar 22 and a handle 41 which extends towards the supporting pipe 32. On the front end of the arm 42 there is mounted a roller 43 in a manner to be engaged with a C-shaped (or channel-shaped) member 44 which is attached to the elevating base 2. In an intermediate portion of the handle 41 there is mounted a roller 45 in a manner to be engaged with a cam plate 46 which is attached to the shift base 3. The operation of this handle 41 will now be explained with reference to FIG. 3. When the handle 41 is in an initial condition as shown in FIG. 1, the roller 43 contacts an upper edge 44a of the C-shaped member 44 to thereby hold the elevating base 2 in an upper end position. The roller 45, on the other hand, is in a condition of being out of contact with the groove of the cam plate 46. When the handle 41 is then lifted, the elevating base 2 lowers to the lower end position accompanied by the lowering of the roller 43 while keeping contact with the upper edge 44a. The roller 45 will be in a condition in which it contacts an inclined surface 46a of the cam plate 46. When the handle 41 is further lifted, the elevating base 2 will not lower any more because it is already held in its lower end position by a stopper (not illustrated), whereby the roller 43 leaves the upper edge 44a. The roller 45, on the other hand, moves relatively along the inclined surface 46a to move the shift base 3 along the linear guide 31 via the cam plate 46, whereby a sheave half of each of the pulleys DR, DN enters, or is brought into, the groove of the other as shown in FIG. 3.

An explanation will now be made about the method of operating the jig apparatus 1.

First, in a condition as illustrated in FIG. 1, the belt SB, the drive pulley DR and the driven pulley DR are set in position as described above. Then, the above-described vacuum pump (not illustrated) is operated to thereby evacuate the oil pressure chamber of the drive pulley DR into a negative pressure. As a result, the movable sheave half B2 lowers against the urging force of the spring SP, whereby the groove width of the drive pulley DR is widened. Then, if the handle 41 is pulled up to an intermediate position, the drive pulley DR is lowered. If the handle 41 is further pulled up, the driven pulley DN will, at this time, approach the drive pulley DR while the driven pulley DN keeps on being raised, at a predetermined angle. A sheave half of the respective pulleys DR, DN is placed inside, or is brought into, the pulley groove of the other of the pulleys DR, DN, thereby reducing the distance between the axes of both the pulleys. In this condition, the belt SB is placed into the groove of each of the pulleys DR, DN and thereafter the handle 41 is returned to the initial condition. The operation of the vacuum pump is stopped and the assembling of the belt SB is completed.

In the above-described embodiment, the groove width of the drive pulley DR is widened. However, it is also possible to widen the groove width of the driven pulley DN, or else to widen the groove widths of both the pulleys.

Further, in the above-described embodiment, the movable sheave half B2 is lowered by making the oil pressure chamber into a negative pressure. However, it is also possible to lower the moveable sheave half B2 mechanically by the use of an engaging member which engages with the movable sheave half B2 and urges it downwardly.

Figure 5:
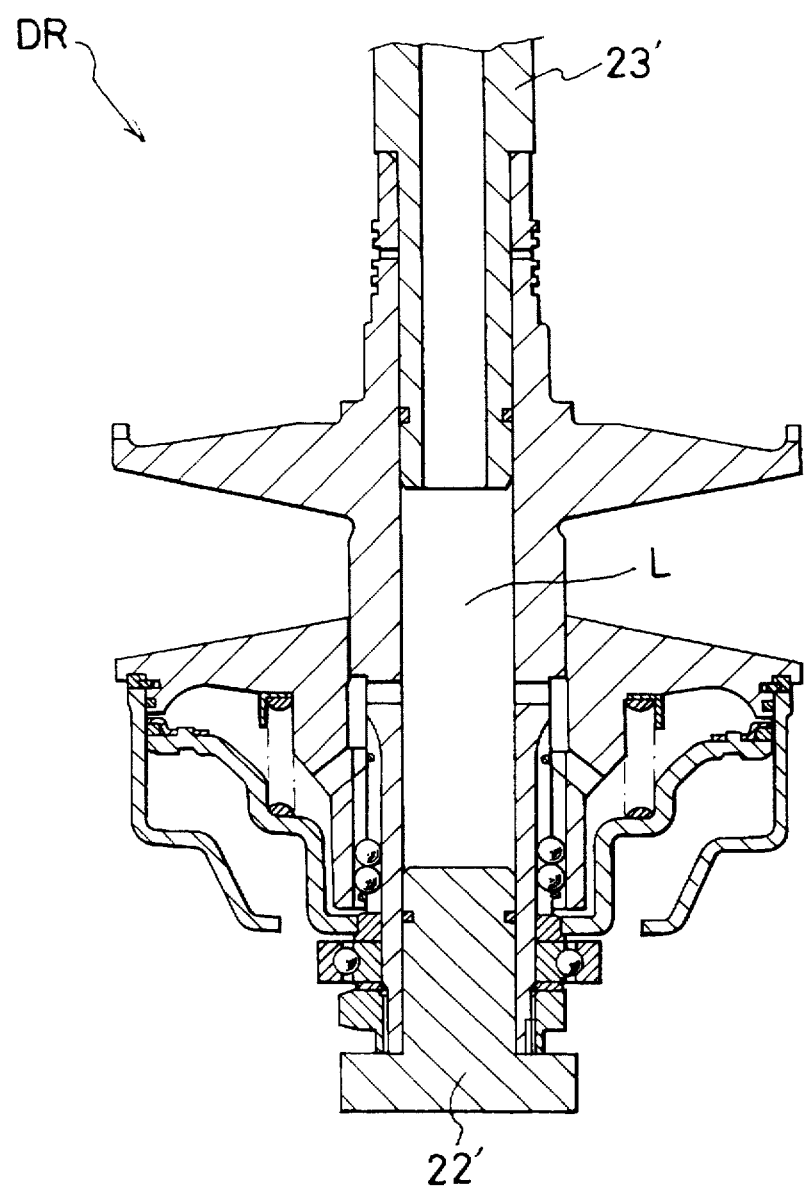
FIG. 5 is a front sectional view showing another embodiment in which the V-groove is widened.

Also, in the above-described embodiment, there are provided the axial hole 23 and the communicating hole 23a in the supporting bar 22. However, the following arrangement may also be employed as shown in FIG. 5. Namely, a solid supporting bar 22' is provided on the elevating base 2. The drive pulley DR is supported on the supporting bar 22', and a hollow plug 23' which is connected to a vacuum pump (not illustrated) is plugged into an upper opening of the oil pressure supply passage L to thereby widen the groove width of the V-groove.

Figure 6:
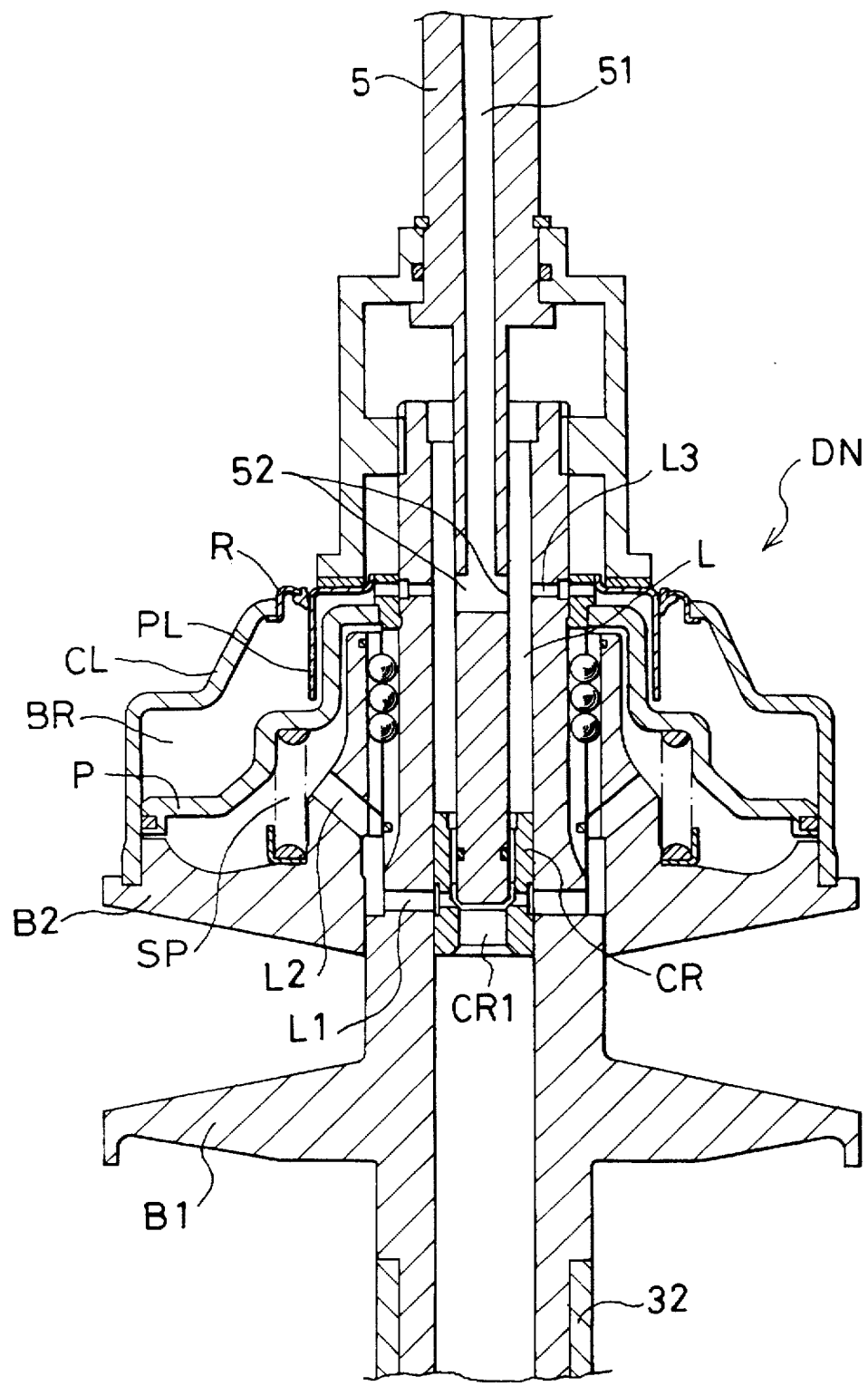
FIG. 6 is a front sectional view showing still another embodiment in which the V-groove is widened by pressurizing.

Furthermore, it is also possible to widen the groove width of the V-groove by pressurizing or giving a positive pressure. Such an embodiment will now be explained by taking the driven pulley DN as an example with reference to FIG. 6. A cylinder plate PL of a cylindrical shape is fixed to a rear surface of the piston P, and a seal R is mounted on an open edge of the cylinder CL so as to be slidable along the surface of the cylinder plate PL, whereby a second oil chamber BR is provided. By pressurizing this oil chamber BR the groove width of the V-groove is widened. In this embodiment, a pressurizing bar 5 is inserted into the oil pressure supply passage L, and pressurized air from a supply source (not illustrated) is sent under pressure from an opening 52 to the oil pressure supply passage L via a pressurizing passage 51 which is provided inside the pressurizing bar 5. The oil chamber BR is thus subjected to a pressure via an oil passage L3. The air inside the oil chamber on the side of the spring SP is arranged to be discharged from the oil passages L1, L2 via an opening CR1 in a bush CR which is fitted onto the oil supply passage L.

As can be seen from the above explanations, according to the present invention, the belt can be fitted onto both the pulleys in a condition in which the pair of pulleys have been assembled. Therefore, the assembly steps of the pulleys are not complicated and, even if there occurs a mistake in assembling one of the pulleys, the other pulley will not be wasted.

It is readily apparent that the above-described jig apparatus for assembling a belt of a variator meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A jig apparatus for use in extending a belt across a pair of pulleys of a variator, said jig apparatus comprising:

a pair of holding members for holding the pulleys such that an axial line of rotation of each of the pulleys becomes parallel to each other;

widening means for widening a groove width of at least one of the pulleys; and moving means for relatively moving said both holding members such that a sheave half of each of the pulleys gets into a pulley groove of the other of the pulleys.

2. A jig apparatus for assembling a belt of a variator according to claim 1, wherein said widening means is made up of a means for inputting a negative pressure or a positive pressure to a hydraulic actuator which controls an axial movement of a movable sheave half of at least one of the pulleys.

3. A jig apparatus for assembling a belt of a variator according to claim 1, wherein said widening means comprises a mechanical means operative to move a movable sheave half of at least one of the pulleys by engaging said movable sheave half and urging it downwardly.

* * * * *